US012748438B1

(12) United States Patent
Hu et al.

(10) Patent No.: US 12,748,438 B1
(45) Date of Patent: Sep. 29, 2026

(54) SELF NAVIGATION METHOD FOR A DRONE OR THE LIKE

(71) Applicant: Jimei Univisity, Xiamen (CN)

(72) Inventors: Yendo Hu, San Diego, CA (US); Yiliang Wu, Xiamen (CN); Runheng Huang, Xiamen (CN); Qiaoduo Hu, Qingdao (CN)

(73) Assignee: Jimei Univisity, Xiamen (CN)

( * ) Notice: Subject to any disclaimer, the term of this patent is extended or adjusted under 35 U.S.C. 154(b) by 0 days.

(21) Appl. No.: 19/459,024

(22) Filed: Jan. 26, 2026

(51) Int. Cl.
*G05D 1/646* (2024.01)
*G06V 10/82* (2022.01)
*G06V 20/17* (2022.01)
*G05D 105/15* (2024.01)
*G05D 109/20* (2024.01)
*G05D 111/10* (2024.01)

(52) U.S. Cl.
CPC ............. *G05D 1/646* (2024.01); *G06V 10/82* (2022.01); *G06V 20/17* (2022.01); *G05D 2105/15* (2024.01); *G05D 2109/20* (2024.01); *G05D 2111/10* (2024.01)

(58) Field of Classification Search
CPC ............... G05D 1/646; G05D 2105/15; G05D 2109/20; G05D 2111/10; G06V 10/82; G06V 20/17
See application file for complete search history.

(56) References Cited

U.S. PATENT DOCUMENTS

2021/0001897 A1* 1/2021 Chai ........................ G06N 3/09

OTHER PUBLICATIONS

A. Ghafourian et al., "Hierarchical End-to-End Autonomous Navigation Through Few-Shot Waypoint Detection," in IEEE Robotics and Automation Letters, vol. 9, No. 4, pp. 3211-3218, Apr. 2024, doi: 10.1109/LRA.2024.3365294. (Year: 2024).*

* cited by examiner

*Primary Examiner* — Dylan M Katz
(74) *Attorney, Agent, or Firm* — MEAGHER EMANUEL LAKS GOLDBERG & LIAO, LLP

(57) ABSTRACT

A method for autonomous visual route following for an autonomous vehicle such as a drone is described. In the route learning phase, the method compresses panoramic views captured by a camera mounted on the autonomous vehicle into low-dimensional embedding vectors via a lightweight neural network and dynamically decides on snapshot storage based on a confidence of direction estimates, thereby constructing an adaptive path memory sequence. In a homing phase, a source-sink strategy is employed by the autonomous vehicle to dynamically fuse the guidance vectors from two consecutive path snapshots (forward and backward) based on their confidence levels, generating continuous and smooth navigation commands. Waypoint updates are automatically triggered by a critical flip criterion.

5 Claims, 6 Drawing Sheets

SELF NAVIGATION METHOD FOR A DRONE OR THE LIKE

TECHNICAL FIELD

Present disclosure relates in general to the field of autonomous navigation for drones, robotics or the like. More specifically, it relates to systems and methods for visual route following capabilities for drones or robotics that utilize neural networks to compress image snapshots into lightweight embedding vectors for relative direction estimation. The disclosure may be used for. e.g., miniature mobile or aero platforms, such as micro unmanned aerial vehicles. As used herein, a vehicle is a movable apparatus or transporter which may be land, sea or aero based, and may be, e.g., a plane, train, automobile, boats, robot, drone, and more.

BACKGROUND

Autonomous navigation is a critical capability for unmanned mobile robots or drones, particularly Unmanned Aerial Vehicles (UAVs) performing tasks such as environmental reconnaissance, search and rescue, and delivery operations. While Global Positioning Systems (GPS) are commonly used for outdoor navigation, they suffer from signal occlusion and multipath interference in urban and/or indoor environments, rendering them unreliable in certain scenarios. Similarly, indoor wireless positioning systems often require expensive dedicated infrastructure and maintenance. Consequently, researchers have increasingly focused on navigation solutions relying on onboard sensors. The present disclosure provides novel solutions to the above mentioned problems.

SUMMARY

A method for autonomous navigation by an autonomous vehicle is provided, the method comprising: in a route learning phase to learn a route: 1) acquiring views, via an image capture device mounted on the autonomous vehicle; 2) encoding, via a neural network, the acquired views into embedding vectors; 3) selecting snapshot locations; and 4) storing the embedding vectors of the corresponding views of the selected snapshot locations and associated heading information as route snapshots to form a rout memory sequence; and in a return homing navigation phase: 1) acquiring a current view, via the image capture device mounted on the autonomous vehicle; 2) encoding, via the neural network, the acquired current view into an embedding vector; 3) calculating, via the neural network, a relative motion direction between the embedding vector of the current view and the embedding vectors of selected one or more route snapshots in the route memory sequence, wherein the calculated relative motion direction is calculated based on an estimate relative direction value and a probability distribution of the estimated relative direction value between the embedding vector of the current view and the selected route snapshots, and wherein the one or more route snapshots are selected from two of the snapshots toward a source point and one of the snapshots toward a sink point; 4) based on the calculated one or more relative motion directions, combining the heading information of the route snapshots to generate a next navigation control command to guide the autonomous vehicle to return along the learned route; and 5) triggering a flip indication when the autonomous vehicle is past a current sink point; setting the current sink point as a new source point; and designating a next snapshot in a path sequence as a new sink point.

DETAILED DESCRIPTION

Figure 1:
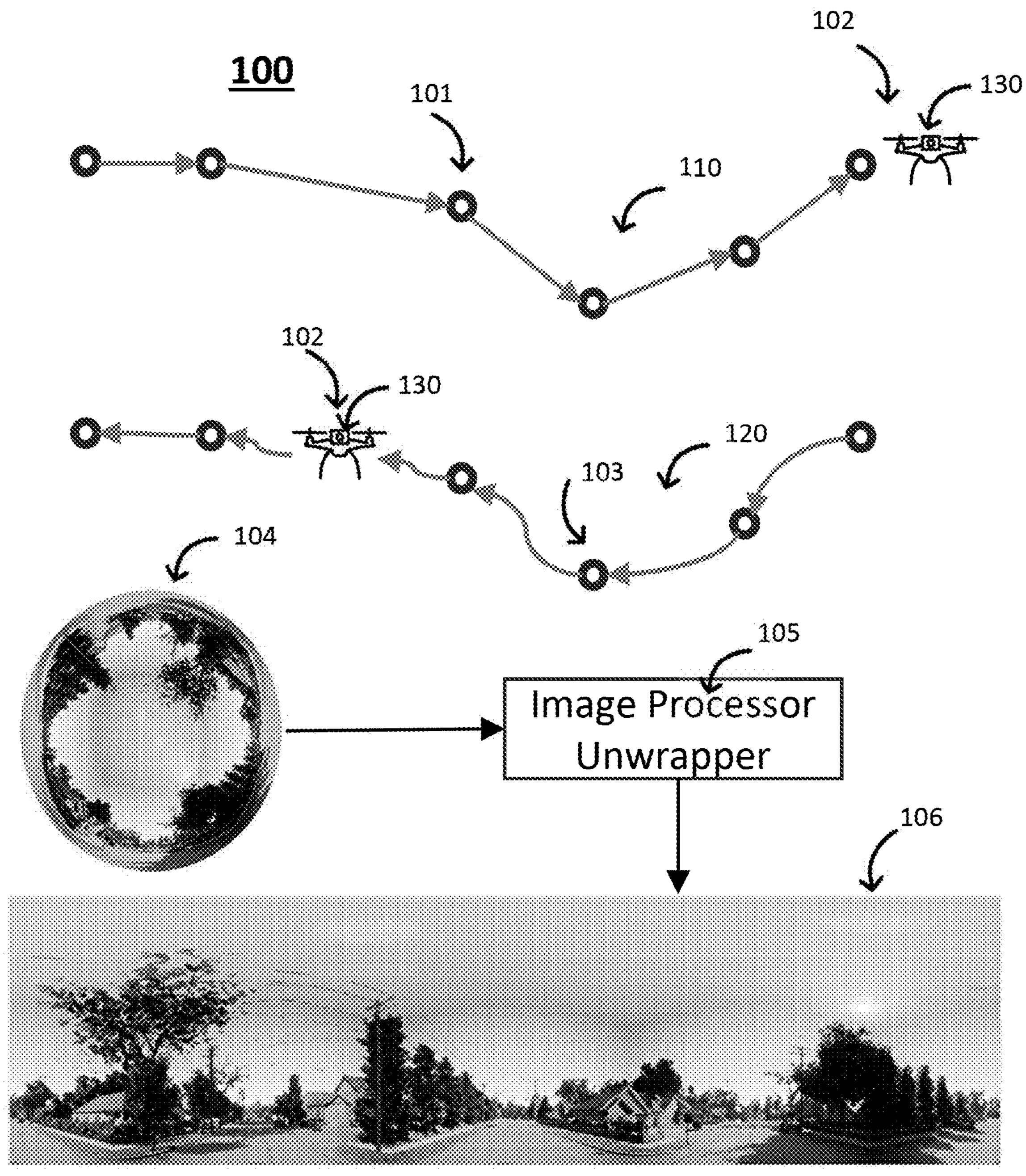
FIG. 1 illustrates a simplified path sequence diagram representation of an embodiment of an autonomous visual route following system, according to an embodiment of a system with which aspects of the present embodiments may be implemented.

The present inventors recognized that existing systems and methods for providing autonomous navigation have many advantages and issues. For example, heavy-duty sensors, such as laser rangefinders, provide high precision but consume significant power and payload capacity, limiting the flight endurance of small UAVs. Visual sensors offer a lightweight alternative; however, mainstream visual navigation approaches like Simultaneous Localization and Mapping (SLAM) typically demand substantial computational resources and memory storage. A significant drawback of SLAM-based approaches is that memory consumption often grows linearly with the navigation distance, which poses challenges for long-range missions on resource-constrained platforms.

To address these limitations, research has moved into bio-inspired navigation models, using snapshot-based visual homing techniques observed in insects. In these models, a robot navigates by aligning its current view with stored images (snapshots) of target locations. However, traditional snapshot models face significant challenges. Storing full-resolution images consumes excessive memory, while feature-point extraction (e.g., SIFT) can still result in data redundancy and increased computational complexity. Furthermore, existing methods employ fixed-interval sampling for recording snapshots along a route. This approach is inefficient, because it disregards environmental heterogeneity; it results in over-sampling in feature-rich areas (wasting memory) and potential under-sampling in feature-poor areas, which can lead to navigation failure.

Neural network-based encoding offers a pathway to compress visual information, but existing approaches have limitations. Some neural models suffer from information capacity ceilings or catastrophic forgetting during incremental learning. Additionally, while deep learning has enabled relative pose estimation between images, many existing networks are computationally expensive, designed primarily for indoor pinhole camera models, or fail to account for the specific distortion characteristics of panoramic or fisheye imagery used in omnidirectional navigation. Therefore, there is a need for a navigation system that effectively balances memory efficiency, computational load, and navigation accuracy for long-distance visual route following.

The presented disclosure works to improve on the limitations that exist with the previous and current systems and methods. The following lists some highlights and advantages of the present disclosure, as described herein:

1. An embodiment according to an aspect of the disclosure may comprise a 360-degree camera mounted on a vehicle capable of 3 degrees of translational motion freedom.
2. An embodiment according to an aspect of the disclosure may further comprise a processing unit that captures the video from the camera. The video is then processed through the method.
3. An embodiment according to an aspect of the disclosure may comprise an outbound route exploring phase which captures visual aspects. The embodiment may comprise: recording an initial snapshot at a current location, wherein the snapshot is compressed into an embedding vector by a neural network; continuously capturing real-time panoramic views as the location changes; calculating a concentration metric for each real-time panoramic view relative to the initial snapshot, wherein the concentration metric represents a confidence level of a directional estimation; and triggering storage of a new snapshot when the concentration metric falls below a predetermined threshold, thereby dynamically adapting a sampling interval based on environmental feature richness to minimize storage redundancy.
4. An embodiment according to an aspect of the disclosure may achieve autonomous visual route following an inbound homing phase. The embodiment may comprise, for example: capturing a current view of an environment; compressing the current view into a current embedding vector; retrieving a preceding snapshot vector and a succeeding snapshot vector from a stored route sequence; simultaneously estimating a first relative direction with a first confidence score between the current view and the preceding snapshot vector, and a second relative direction with a second confidence score between the current view and the succeeding snapshot vector; and generating a fused navigation command by computing a weighted average of the first relative direction and the second relative direction, wherein weights are determined based on the first and second confidence scores to create a continuous navigation field. In an embodiment, these two views correspond to the front and the back views from the capturing device (90 degree windows of the panoramic video).

The following sections cover aspects of technical principles, implementation steps, and core components of the autonomous visual route following algorithm. These embodiments may integrate bio-inspired navigation mechanisms, neural network compression techniques, and dynamic navigation strategies, focusing on addressing some core challenges of memory efficiency, computational lightness, and navigation robustness for small mobile platforms such as micro unmanned aerial vehicles (UAVs) in indoor or GPS-denied environments.

Snapshot-based models guide return journeys by memorizing visual information from specific locations. However, the efficacy of such methods is limited by a fundamental conflict: ensuring navigation reliability requires densely storing snapshots along the path, but this leads to rapid consumption of memory resources; conversely, sparse sampling to optimize memory usage easily leads to navigation failure due to environmental visual changes or viewpoint shifts. The root cause lies in the fact that traditional approaches treat each snapshot as an isolated attractor point with a fixed range of influence, failing to fully utilize the continuity of the path and the intrinsic relationships between visual information, resulting in jumpy navigation behavior between points rather than continuity.

Embodiments of the present disclosure are based on some important insights recognized by the present inventors, as described below. Some of the aforementioned problems lie in the static and discrete nature of the representation and utilization strategy of the navigation landmarks. Therefore, inventors found that an advantageous solution is to create a dynamic, adaptive, and continuous method and system for visual path representation and navigation. The present disclosure aims to break through this bottleneck by integrating modern neural network compression technology with bio-inspired intelligent decision-making mechanisms.

"Panoramic Snapshot" refers to a scene image captured by a panoramic camera and preprocessed, or its compressed representation. "Relative Direction Probability Distribution" is a core output of the neural network, describing the probability of the possible motion direction of the current view relative to a stored snapshot within a discretized directional space. "Concentration", related to the above, is an indicator measuring the concentration degree of this probability distribution, which directly reflects the confidence level of the respective direction estimate. "Catchment Area" is defined as the effective navigation area surrounding a snapshot, within which navigation commands based on that snapshot are reliable. "Source point" and "Sink point", mentioned in the homing strategy, refer to the previously passed snapshot and the next snapshot being approached by the robot, respectively.

FIG. 1 illustrates a simplified path sequence diagram representation of an embodiment for an autonomous visual route following system, including a camera input and a dual-phase path (outbound and homing) with snapshot nodes. As shown in FIG. 1, diagram representation 100 illustrates a complete cycle of an autonomous visual route following system and method, encompassing the entire process from environmental information learning to final navigational return. This FIG. 100 delineates the data flow and key operations within the two core phases of the present disclosure, namely, the route learning (outbound) phase and the homing navigation (inbound) phase.

The upper portion of FIG. 1 depicts the outbound flight path 110 of the UAV 102 during its mission execution. The trajectory line with an arrow indicates the direction of the UAV's movement from the starting point towards the mission target area. Along this path 110, a series of points labeled 101 represent key locations dynamically selected and stored by the system, referred to as "snapshot points." The image capture device 130 such as, e.g., a fisheye and/or 360-degree camera 130 mounted on the UAV 102 continuously captures raw 360-degree environmental images during flight. In an embodiment, the camera 130 may be installed on the top of the airframe facing the sky or on the bottom to obtain an optimal forward field of view.

The fisheye images captured by the camera 130 are shown as images 104 in FIG. 1. To ensure effective processing of these images 104 by the navigation system and method, the raw fisheye images 104 are immediately subjected to processing by an image preprocessing module 105. This preprocessing step typically includes operations such as unwrapping, which converts the curved fisheye view into a standardized, flattened panoramic strip image 106 unfolded along the azimuth. This formatted panoramic image 106 serves as the foundation for subsequent neural compression and analysis.

The lower portion of FIG. 1 illustrates the homing flight path 120 executed by the UAV 102 after mission completion. In this phase 120, the UAV102 returns to the starting point along a path 120 generally opposite to the outbound route. The previously stored snapshot points, indicated by label 103 on the lower path, now act as navigational reference beacons. During homing, the UAV similarly captures the current view via the camera 104 and generates a real-time panoramic image 106 through preprocessing 105. The system will compute the embedding vector of the current view in real-time, compare it with the embedding vectors of adjacent snapshot points 103 from the path memory, estimate the relative direction via the neural network, and ultimately generate the navigation commands controlling the UAV's return. The spatial coincidence of the lower path 110 with the upper path 120 intuitively embodies the core "teach-and-repeat" paradigm.

Figure 2:
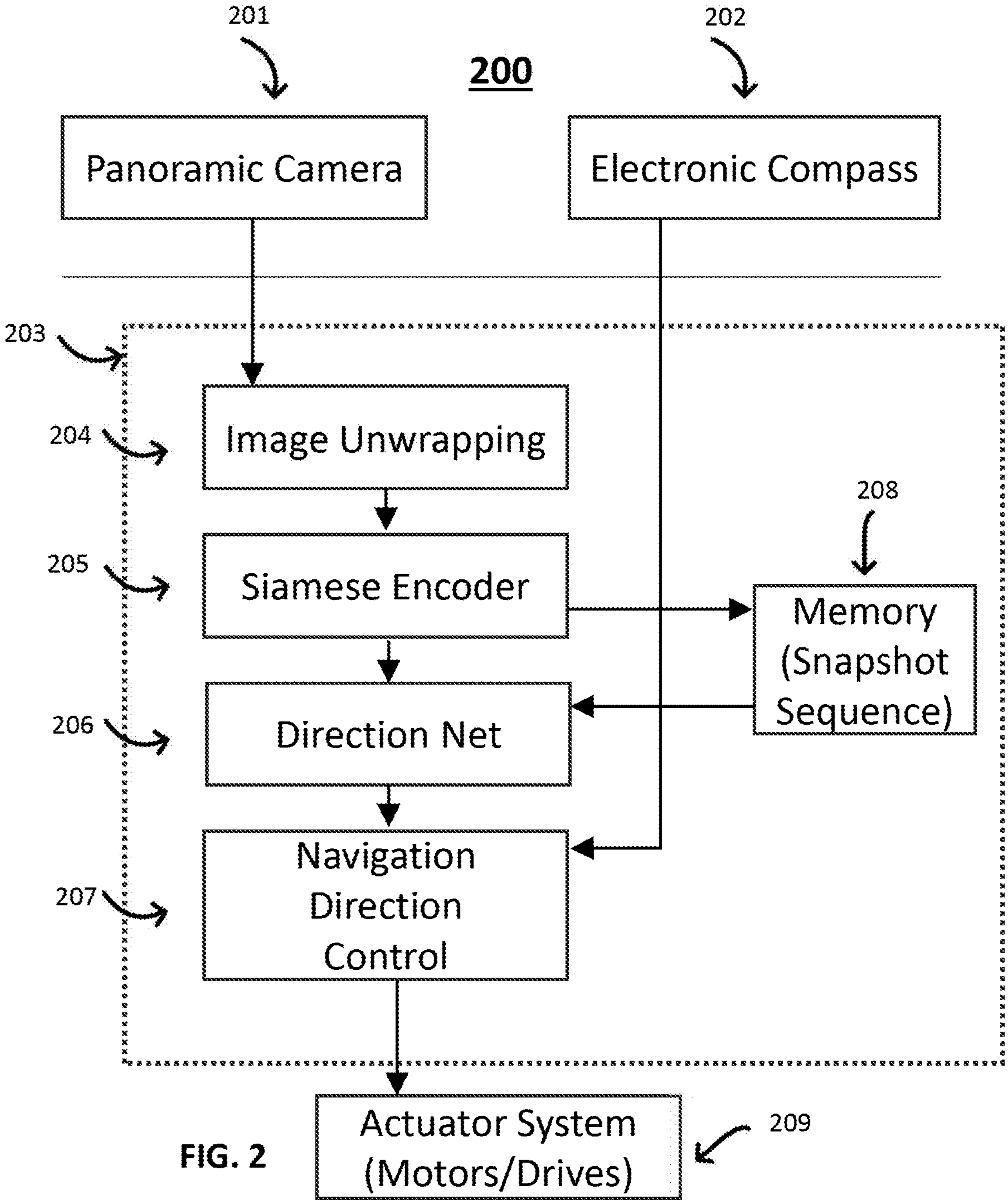
FIG. 2 illustrates a block diagram of an embodiment of a system with which aspects of the present embodiments may be implemented.

FIG. 2 illustrates a block diagram of an exemplary apparatus 200 according to aspects of the present disclosure. As shown in FIG. 2, exemplary components of an apparatus 200 having autonomous visual route following capability are shown, including complete processing outlines from input signals to execution commands. This illustrating diagram does not distinguish between the outbound and homing phases, instead focusing on the collaborative logic and data interaction relationships between various functional modules. The system's core inputs comprise two key types of information: one is the panoramic image corresponding to label 201 (i.e., the preprocessed, unfolded panoramic image 106 from FIG. 1), and the other is the electronic compass labeled 202, whose primary role is to provide the UAV's real-time heading angle (yaw angle) data, establishing an attitude reference for subsequent direction estimation and coordinate transformation.

The panoramic image 201 first enters the image preprocessing module labeled 204. This module, is consistent in function with module 105 in FIG. 1, further optimizes the raw captured image into a standardized format suitable for input to a Siamese neural network encoder 205 through a spherical projection transformation, distortion correction, and size regularization, ensuring the accuracy of feature extraction.

The preprocessed image from the output of image unwrapping module 204 is then fed into one encoder branch 205 of a lightweight Siamese neural network encoder 205. This encoder 205, being a core component of the AI network and composed of multi-layer convolutional neural networks, is responsible for extracting high-level, robust features from the image and compressing them into a low-dimensional embedding vector. This embedding vector serves as an efficient, dense mathematical representation of the current visual scene.

A real-time navigation command generation path operates in parallel, regardless of whether the system 200 is in the learning or homing phase. The embedding vector of the current image is sent to a direction network 206. During the homing phase, the other input to the direction network 206 comes from the embedding vector of a relevant snapshot retrieved from the storage module 208. During the learning phase, current image is compared with the previous snapshot. The direction network 206 (typically a decoder composed of fully connected layers) does not output a single angle value, but rather outputs a discretized relative direction probability distribution. The expected value of this directional distribution indicates the most probable relative movement direction, while the concentration of the distribution quantifies the confidence level of this estimation.

This directional estimate, comprising both directional and confidence information, is sent to the navigation control module 207. This module 207 acts as an executor of decision logic, according to aspects of the present disclosure. Module 207 executes different strategies or algorithms based on the system's current phase (learning or homing) and the available snapshot information. In the homing phase, if within the dual-snapshot guidance zone, it implements the Source Sink strategy, performing dynamic confidence-based weighted fusion of the two relative direction vectors to ultimately generate a target heading angle. This target heading angle is compared with the current heading provided by the electronic compass 202. Finally, through a controller, a processor, or other control algorithm, motor control commands are calculated to counteract deviation and output to the UAV's electronic speed controllers (ESCs) and motor system 209, thereby achieving closed-loop control of the UAV's flight.

Figure 3:
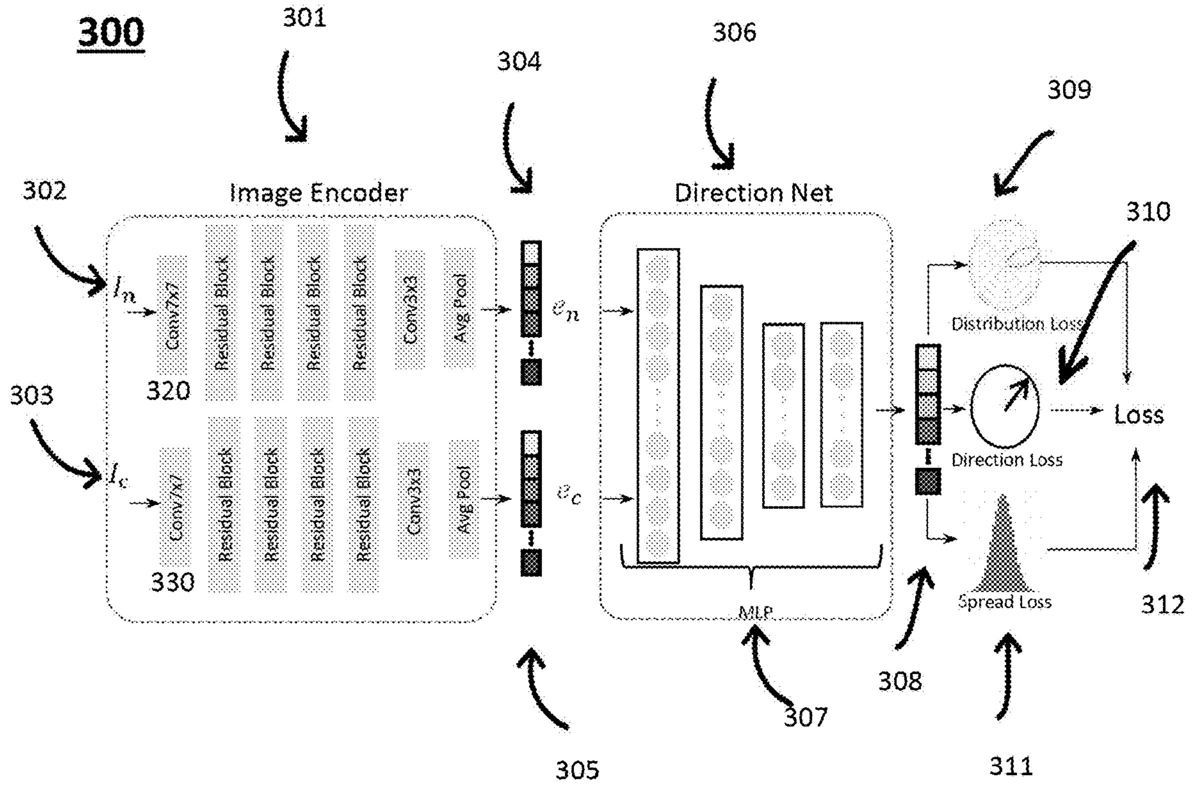
FIG. 3 illustrates another block diagram of an embodiment of a system with which aspects of the present embodiments may be implemented.

FIG. 3 illustrates an exemplary system 300 having a lightweight Siamese neural network 301 for image encoding followed by a relative direction estimation module or processor 306, according to aspects of the present disclosure. The neural network 301 serves as a computational core, bearing the task of transforming raw pixel information into intelligent decisions usable for navigation. Design objectives of system 300 are to achieve high-precision relative direction estimation while meeting the stringent constraints on computational complexity and memory footprint imposed by embedded platforms.

The Siamese encoder 301 comprises two encoder branches 320 and 330 that are structurally identical and share weights. This design allows the network 301 to process two input images simultaneously, one image 302 from a snapshot point in the path memory (denoted as I_n), and the other image 303 captured in real-time at the UAV's current position (denoted as I_c). The main body of each encoder branch may be a tailored and modified ResNet-18 convolutional neural network. The final stage of the fully connected layer originally designed for ImageNet classification in ResNet-18 is removed to better adapt it to the characteristics of panoramic images. Each encoder branch independently performs feature extraction and compression on the input image, ultimately mapping a panoramic image to a low-dimensional, dense embedding vector 304, 305. This embedding vector (128-dimensional) is an efficient representation of the original image, capturing the most essential visual information for the navigation task.

Subsequently, these two embedding vectors 304 and 305, representing the snapshot point and the current point respectively, are concatenated and fed into a multilayer perceptron (MLP) referred to as the direction network 306. This direction network 306 consists of several fully connected layers 307. One function of the direction network 306 is to infer the relative movement direction from the current position to the snapshot point based on the visual information encapsulated within the two embedding vectors 304 and 305. The output 308 of the direction network is not a simple scalar angle value, but rather a vector of dimension Nx1, where N is the number of intervals after discretizing the 360-degree horizontal direction. Each element value of this output vector, after normalization via the Softplus function, represents the probability that the UAV is located within that discrete direction interval relative to the snapshot point. Therefore, the network's output is a complete probability distribution, which provides a richer information than a single-point estimate, particularly regarding the uncertainty of the estimation result. The final expected relative direction value can be obtained by calculating the expected vector of this probability distribution, i.e., performing a weighted average of the unit vectors for each direction interval according to their probability values, thus yielding a continuous and differentiable direction estimate.

To train this network, a custom composite loss function 312 was used. It is composed of three collaborative loss terms to ensure the network learns accurate, reasonable, and confident direction estimates simultaneously. The distribution loss 309 directly constrains the shape of the network's output distribution to match the ideal target distribution by calculating the mean squared error between the network's predicted probability distribution and the true label distribution.

The direction loss 310 acts on the final expected direction vector; it penalizes the angular deviation between the predicted direction and the true direction using negative cosine similarity, ensuring the accuracy of the estimation result in terms of angle value. The spread loss 311 is responsible for penalizing the dispersion of the predicted probability distribution, encouraging the network to produce concentrated, unimodal distributions and avoiding outputting ambiguous, flat, multi-modal distributions. This essentially guides system 300 to possess appropriate confidence in its estimation results. The overall training objective is to minimize the weighted sum of these three losses, thereby systematically optimizing the network's various performance metrics.

Through this end-to-end training, the system 300 learns to extract robust features related to motion direction from complex visual scenes, encode these features into compact vectors, and finally decode them into probabilistic direction instructions usable for precise navigation. This design enables the present invention to possess powerful environmental understanding and reasoning capabilities while maintaining a lightweight profile.

Figure 4:
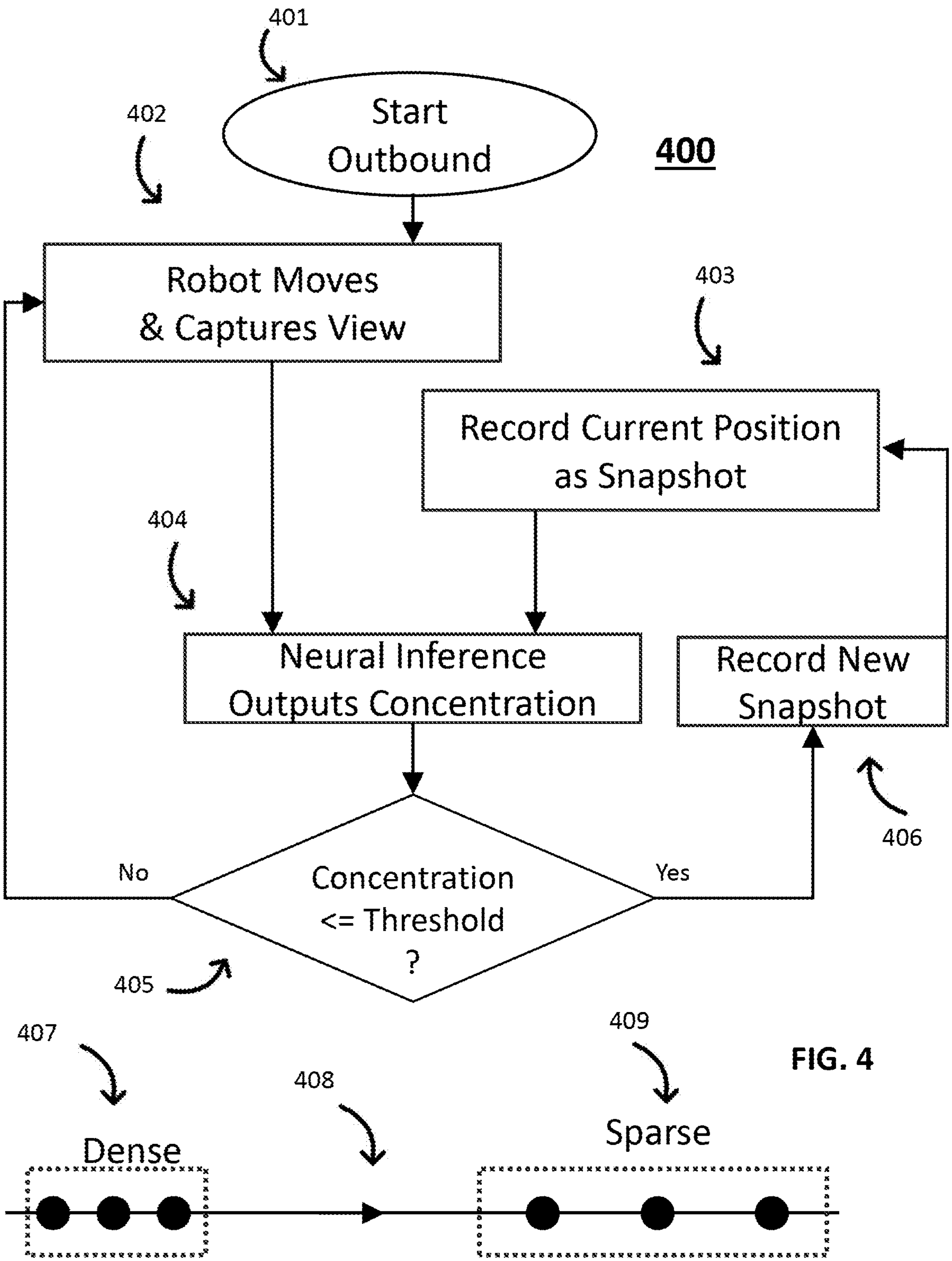
FIG. 4 illustrates an embodiment of a process with which aspects of the present embodiments may be implemented.

FIG. 4 illustrates an embodiment of a method 400 with which aspects of the present embodiments may be implemented. An exemplary process 400 is shown in FIG. 4 for dynamically constructing the path memory sequence during the UAV's outbound exploration phase (route learning phase). The process 400 begins at 401, where after a system initialization, the process 400 enters a main loop 402. Within this loop, an exemplary UAV moves according to a predetermined exploration strategy, while its onboard panoramic camera continuously captures real-time views of the environment. Simultaneously, at 403, process 400 retrieves the last successfully stored path snapshot from persistent storage as a reference benchmark.

Each newly captured current view frame, along with the previously stored snapshot at 403, is fed into the core neural network (e.g., system 300 in FIG. 3) of the present disclosure for inference computation at 404. As detailed previously in FIG. 3, a neural network system 300 outputs not only an estimated relative direction value but, more crucially, an indicator of the confidence level of this estimation—the concentration. This concentration value quantifies the degree of visual similarity between the current view and the reference snapshot, thereby indirectly reflecting whether the current position remains within the effective navigation area (i.e., the "catchment area") of that snapshot.

Subsequently, at 405, the process 401 performs a critical decision-making 405: comparing the real-time calculated concentration against a preset threshold. At 405, if the concentration is not than smaller or equals to (i.e., greater than) the threshold, process 400 then commands the UAV to continue moving, proceeding to the next cycle, at 402. This is because this level of concentration indicates that the current position is still effectively covered by the catchment area of the previous snapshot, the visual cues are sufficiently reliable, and there is no need to store the redundant information.

On the other hand, if the concentration drops below or is equal to the preset threshold at 405 (signifying that the UAV is likely about to leave or has already left the reliable guidance range of that snapshot, and the visual characteristics of the current position have changed significantly), process 400 invokes a snapshot storage operation at 406. The embedding vector obtained by encoding the current panoramic view through the neural network system 300 in FIG. 3, along with state information such as the current heading angle, is stored as a new key waypoint snapshot into the memory sequence at 406.

Elements 407, 408, and 409 on the bottom of FIG. 4 highlight, through comparison, the significant advantage of the dynamic storage strategy employed in the present invention over traditional methods. Under a fixed-interval sampling strategy 407, regardless of environmental feature variations, sampling points are uniformly distributed. This may lead to unnecessary oversampling 409 in areas rich with visual environmental features (e.g., near building entrances, trees). This oversampling may cause memory waste; whereas in feature-sparse open areas, insufficient sampling might lead to navigation failure. In contrast, the dynamic strategy 408 of the present disclosure intelligently adapts to environmental changes. It automatically increases the sampling density in areas where visual features change dramatically and widens the snapshot spacing in stable areas. This achieves maximum memory usage efficiency while ensuring navigation continuity.

Through the process 400 described above and illustrated in FIG. 4, the present disclosure realizes the intelligent and adaptive construction of the path memory. It no longer just passively records the environment but actively perceives environmental changes, recording new landmarks only when substantial changes occur in the visual scene. This makes the entire navigation system both highly efficient and robust.

Figure 5:
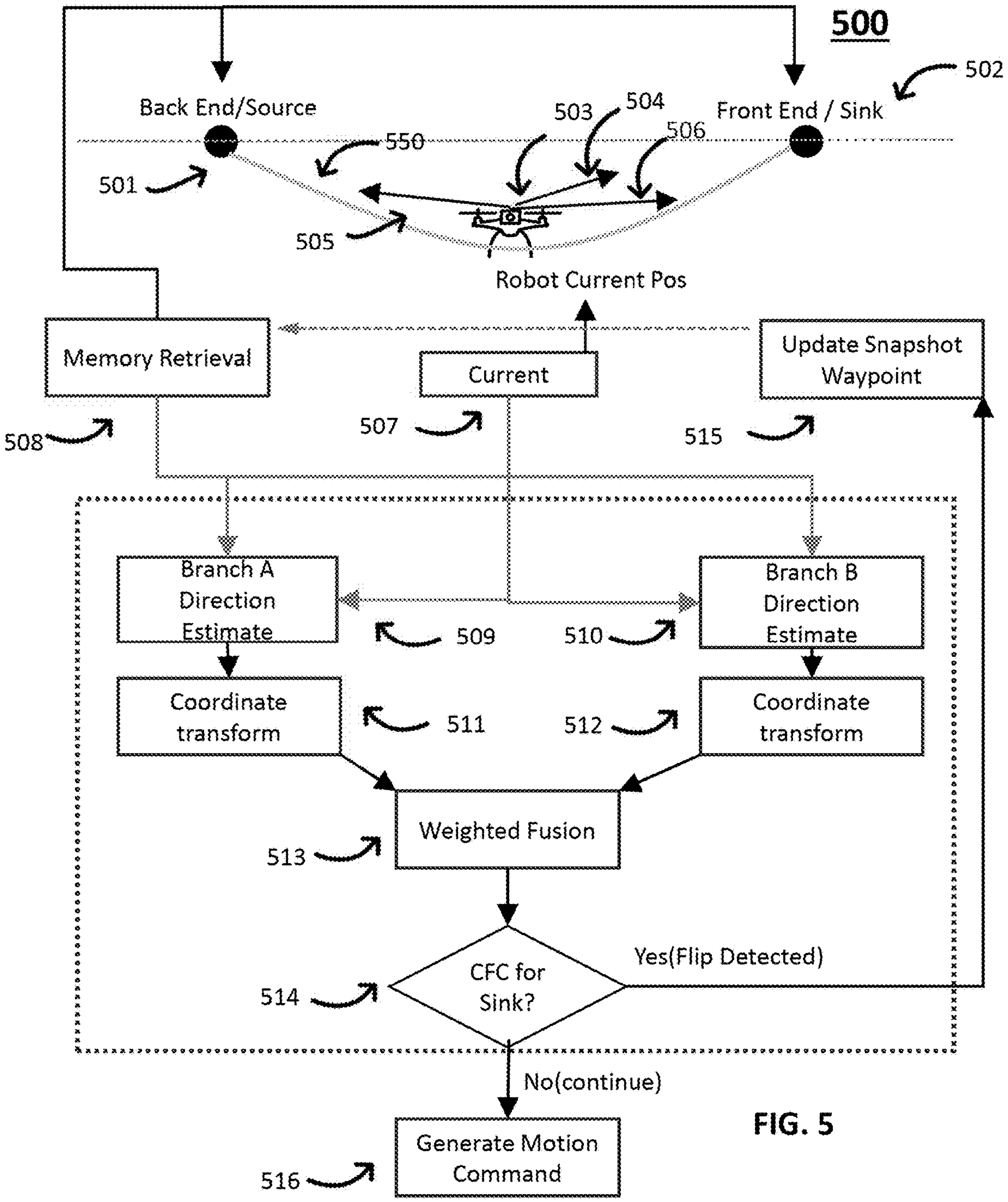
FIG. 5 illustrates another embodiment with which aspects of the present embodiments may be implemented.

FIG. 5 illustrates another embodiment 500 with which aspects of the present embodiments may be implemented. FIG. 5 shows how a UAV 503 achieves continuous and smooth navigation during the homing phase by collaboratively utilizing two path snapshots, one ahead and one behind. As shown, while the UAV 503 moves along a path 550, system 500 simultaneously monitors two key reference points: the previous snapshot located behind it, which it has already passed (called the source point or back end point 501), and the next snapshot ahead, which it is approaching (called the sink point or front end point 502). The system 500 then calculates a guidance direction 505 from the current position 507 towards the source point 501, as well as a guidance direction 506, from the current position 507 towards the sink point 502, respectively. These two positions 505 and 506 are then used to generate a new and next guidance direction 504 for a motion command at 516 accordingly, as to be described in more detail below.

An advantage of the above described strategy lies in the fact that the final next navigation direction 504 is not simply choosing one of these two directions 505, 506, but is generated through a dynamic weighted fusion process. To understand how this fused navigation command at 516 is produced, it is necessary to examine its processing flow. This process begins by retrieving the embedding vectors at 508 of the two currently used snapshots from a path memory bank. These two vectors 505, 506 are fed in parallel into two structurally identical relative direction estimation networks 509 and 510. Network 509 processes the vector of the current view relative to the source snapshot, outputting the direction probability distribution and its concentration (confidence level) relative to the source point 501. Similarly, network 510 processes the vector of the current view relative to the sink snapshot, outputting the direction probability distribution and its confidence level relative to the sink point 502.

Next, the two transformed global direction vectors are sent to the direction fusion and weight calculation modules 512 and 513 respectively. In these respective modules 512 and 513, the fusion weights of the two direction vectors are not fixed but are dynamically determined by the confidence levels of their respective direction estimates. Specifically, the vector with a higher confidence level (manifested as a more concentrated probability distribution output by the neural network) is assigned a greater weight in the fusion. This dynamic weighting mechanism ensures that the navigation system always tends to trust the more reliable guidance signal. The final fused direction vector 504 serves as the targeted next navigation direction for the UAV in the current cycle.

Simultaneously, system 500 continuously runs a critical judgment module 514, namely a snapshot point update decision-maker. A function of this module is a critical flip criterion. It continuously monitors the relative direction between the UAV and the current sink point. When the UAV 503 gradually approaches and finally flies past the sink point, this relative direction undergoes an abrupt change close to 180 degrees (a flip). Once such a flip is detected, module 514 immediately triggers an update operation at 515 by setting the current sink point as the new source point and designating the next snapshot in the path sequence as the new sink point. If no flip is detected at 514, system 500 maintains the current snapshot points unchanged, continues to generate navigation commands to control the UAV's movement at 516.

Figure 6:
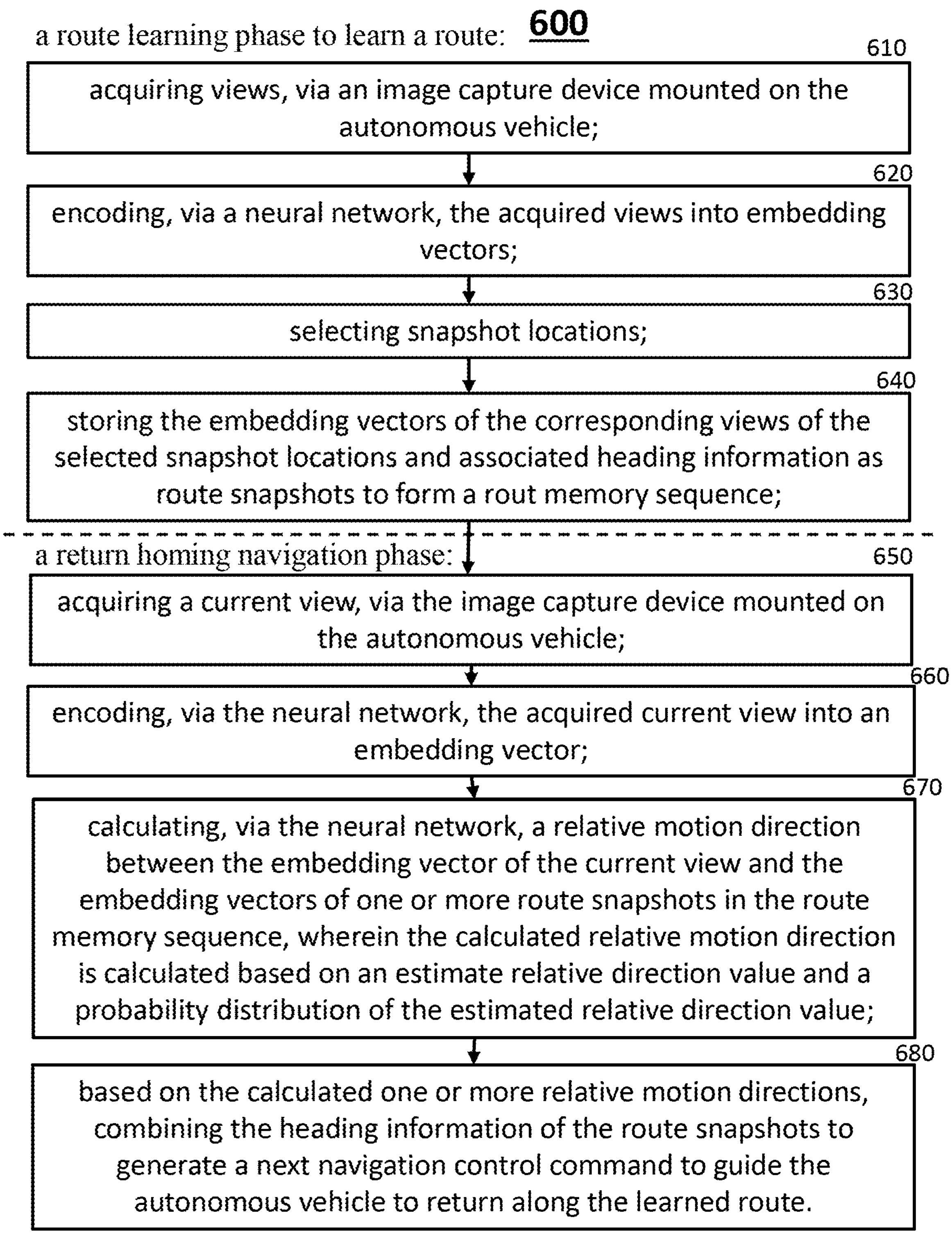
FIG. 6 illustrates an embodiment of another process with which aspects of the present embodiments may be implemented.

FIG. 6 illustrates an embodiment of an autonomous navigation process 600 implemented by an exemplary autonomous vehicle such as vehicle 503 shown in FIG. 5. In FIGS. 6, 610 to 640 are implemented by the autonomous vehicle in a route learning phase to learn a route, and 650 to 680 are implemented by the autonomous vehicle in a return homing navigation phase. At 610, in a route learning phase, process 600 acquires views, via an image capture device mounted on the autonomous vehicle. At 620, process 600 encodes, via a neural network, the acquired views into embedding vectors. At 630, process 600 selects snapshot locations. At 640, process 600 stores the embedding vectors of the corresponding views of the selected snapshot locations and associated heading information as route snapshots to form a rout memory sequence.

At 650, process 600 in a return homing navigation phase, acquires a current view, via the image capture device mounted on the autonomous vehicle. At 660, process 600 encodes, via the neural network, the acquired current view into an embedding vector. At 670, process 600 calculates, via the neural network, a relative motion direction between the embedding vector of the current view and the embedding vectors of one or more route snapshots in the route memory sequence, wherein the calculated relative motion direction is calculated based on an estimate relative direction value and a probability distribution of the estimated relative direction value between the embedding vector of the current view and the selected route snapshots. In one embodiment, the one or more route snapshots are selected from two of the snapshots toward a source point and one of the snapshots toward a sink point. At 680, process 600 based on the calculated one or more relative motion directions, combines the heading information of the route snapshots to generate a next navigation control command to guide the autonomous vehicle to return along the learned route.

In one embodiment, a flip indication is triggered when the autonomous vehicle is past a current sink point. The current sink point is set as a new source point; and a next snapshot in a path sequence is designated as a new sink point.

In an embodiment, the image capture device may be a panoramic camera or a fisheye camera, and the autonomous vehicle is an aero drone. In another embodiment, the neural network is lightweight and may comprise a Siamese encoder structure, processing input image pairs with shared weights, and finally encoding the image information into fixed-dimension embedding vectors through fully connected layers. In yet another embodiment, an estimation of the relative motion direction is implemented by a decoding network, the output of which is a probability distribution of the relative direction in a discretized directional space, rather than a single scalar value.

In another embodiment, a loss function used for training the neural network combines a direction loss, a distribution loss, and a diffusion loss to simultaneously optimize the accuracy of direction estimation, the consistency between the output distribution and the true distribution, and the concentration of the distribution. In another embodiment, the route learning phase comprises a dynamic snapshot storage strategy: evaluating in real time the catchment area range of the current view's location by calculating the concentration of the relative direction probability distribution, and triggering the storage of a new route snapshot when the concentration falls below a preset threshold.

In another embodiment, during the homing phase, if the vehicle is within a catchment area of a single snapshot, the navigation instruction is generated by transforming the estimated relative direction vector into a coordinate system based on the robot's heading at the time the snapshot was stored. In yet another embodiment, during the homing phase, a source/sink strategy is employed: simultaneously calculating the relative directions between the current view and one or more previous key snapshots (source) and one or more subsequent key snapshots (sink) in the route memory sequence, and generating one or more independent navigation vectors. The one or more independent navigation vectors may be dynamically weighted and fused based on the confidence of their direction estimates to generate the final navigation instruction, wherein the confidence is measured by the concentration of the relative direction probability distribution.

In yet another embodiment, the update of the currently referenced snapshot waypoint is triggered by a critical flip criterion: when an approximately 180-degree flip is detected in the estimated relative direction between the current view and the referenced snapshot, the referenced snapshot is updated to the next snapshot on the route.

Accordingly, various embodiments for autonomous visual route following for indoor micro drones are provided, aiming to address the problem of memory efficiency, continuity, and robustness in long-distance visual navigation on resource-constrained platforms. In an embodiment, in the route learning phase, the embodiment compresses panoramic views into low-dimensional embedding vectors via a lightweight neural network and dynamically decides on snapshot storage based on the confidence of direction estimates, thereby constructing an adaptive path memory sequence. In a homing phase, a source-sink strategy is employed to dynamically fuse the guidance vectors from two consecutive path snapshots (forward and backward) based on their confidence levels, generating continuous and smooth navigation commands. Waypoint updates are automatically triggered by a critical flip criterion. Consequently, the embodiment achieves memory-efficient, continuously navigable, and environmentally adaptive autonomous round-trip navigation.

The foregoing descriptions are merely exemplary embodiments of this disclosure and do not limit its scope. Any equivalent modifications or variations based on the teachings herein remain within the coverage of this disclosure. Those skilled in the art will readily conceive of other implementations after considering the specification and practical applications.

This application is intended to cover any adaptations or variations of the disclosure that adhere to its general principles, including common knowledge or conventional techniques in the field not explicitly documented herein. The specification and examples are to be regarded as illustrative, with the scope and spirit of the disclosure defined by the claims.

Furthermore, when a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software computer program, a data stream, or a signal. Even if only discussed in the context of a single form of implementation (for example, discussed only as a method), the implementation of features discussed can also be implemented in other forms (for example, an apparatus or a computer program executable by one or more processor). An apparatus, a device, a module, a component, and etc. can be implemented in, for example, appropriate hardware, software, and firmware, such as, e.g., a processor or the like. The methods can be implemented in, for example, a processor which refers to processing devices in general, including, for example, a computer, a microprocessor, an integrated circuit, or a programmable logic device. Processors also include communication devices, such as, for example, computers, cell phones, portable/personal digital assistants ("PDAs") or watches, and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

The invention claimed is:

1. A method for autonomous navigation by an autonomous vehicle, comprising:
- in a route learning phase to learn a route:
  - acquiring views, via an image capture device mounted on the autonomous vehicle;
  - encoding, via a neural network, the acquired views into embedding vectors;
  - selecting snapshot locations;
  - storing the embedding vectors of the corresponding views of the selected snapshot locations and associated heading information as route snapshots to form a rout memory sequence; and
- in a return homing navigation phase:
  - acquiring a current view, via the image capture device mounted on the autonomous vehicle;
  - encoding, via the neural network, the acquired current view into an embedding vector;
  - calculating, via the neural network, a relative motion direction between the embedding vector of the current view and the embedding vectors of one or more selected route snapshots in the route memory sequence, wherein the calculated relative motion direction is calculated based on an estimate relative direction value and a probability distribution of the estimated relative direction value between the embedding vector of the current view and the selected route snapshots, and wherein the one or more route snapshots are selected from two of the snapshots toward a source point and one of the snapshots toward a sink point; and
  - based on the calculated one or more relative motion directions, combining the heading information of the route snapshots to generate a next navigation control command to guide the autonomous vehicle to return along the learned route; and
  - triggering a flip indication when the autonomous vehicle is past a current sink point;
  - setting the current sink point as a new source point; and
  - designating a next snapshot in a path sequence as a new sink point.

2. The method of claim 1, wherein the image capture device is a panoramic camera for capturing panoramic views, and the autonomous vehicle is a drone.

3. The method of claim 2, wherein the neural network employs a Siamese encoder structure, processing input image pairs with shared weights, and encoding the image information into fixed-dimension embedding vectors through fully connected layers.

4. The method of claim 3, further comprising: during the return homing navigation phase, simultaneously calculating one or more relative directions between the current view and a source point, and one or more relative directions between the current view and a sink point, and generating one or more independent navigation vectors, each respectively for the one or more relative directions.

5. The method of claim 4, further comprising weighting and fusing the one or more independent navigation vectors based on their respective confidence level to generate a final navigation instruction, wherein their respective confidence level is measured by a concentration of a relative direction probability distribution.

* * * * *